(12) United States Patent
Fang et al.

(10) Patent No.: US 12,445,807 B2
(45) Date of Patent: Oct. 14, 2025

(54) LEARNING EMERGENT INDOOR LOCATIONS OF INTEREST WITH MINIMAL INFRASTRUCTURE

(71) Applicant: APPLE INC., Cupertino, CA (US)

(72) Inventors: Mengying Fang, Cupertino, CA (US); Jun Gong, Austin, TX (US); Gierad Laput, Pittsburgh, PA (US)

(73) Assignee: APPLE INC., Cupertino, CA (US)

( * ) Notice: Subject to any disclaimer, the term of this patent is extended or adjusted under 35 U.S.C. 154(b) by 288 days.

(21) Appl. No.: 18/127,594

(22) Filed: Mar. 28, 2023

(65) Prior Publication Data

US 2023/0319509 A1  Oct. 5, 2023

Related U.S. Application Data

(60) Provisional application No. 63/362,308, filed on Mar. 31, 2022.

(51) Int. Cl.
*H04W 4/00* (2018.01)
*H04W 4/02* (2018.01)
*H04W 4/029* (2018.01)

(52) U.S. Cl.
CPC ........... *H04W 4/029* (2018.02); *H04W 4/027* (2013.01)

(58) Field of Classification Search
CPC ............................ H04W 4/029; H04W 4/027
See application file for complete search history.

(56) References Cited

U.S. PATENT DOCUMENTS

| | | | |
|---|---|---|---|
| 11,450,102 B2* | 9/2022 | Huo | G06F 3/0484 |
| 2021/0029500 A1* | 1/2021 | Ye | H04W 4/029 |

* cited by examiner

*Primary Examiner* — Erika A Washington
(74) *Attorney, Agent, or Firm* — Kilpatrick Townsend & Stockton LLP

(57) ABSTRACT

Techniques may include ranging between a mobile device and a ranging device to obtain ranging measurements. In addition, the techniques may include performing inertial measurements, where the inertial measurements include directional measurements of movement of the mobile device. One or more of the ranging measurements or inertial measurements may be used to identify dwell points where the mobile device is stationary. Moreover, the techniques may include determining vectors of movement between the dwell points using inertial measurements. Also, the techniques may include determining a first and second distance from the ranging device by performing a first and second ranging measurement with the ranging device. Further, the techniques may include determining a direction of movement using inertial measurements. The techniques may include determining the mobile device is at the second dwell point by matching the first direction of movement to a vector of movement between the dwell points.

20 Claims, 7 Drawing Sheets

LEARNING EMERGENT INDOOR LOCATIONS OF INTEREST WITH MINIMAL INFRASTRUCTURE

CROSS-REFERENCE TO RELATED APPLICATIONS

This application claims the benefit and priority of U.S. Provisional Application No. 63/362,308, filed on Mar. 31, 2022, entitled "HOME LANDMARKS: LEARNING EMERGENT INDOOR LOCATIONS OF INTEREST WITH MINIMAL INFRASTRUCTURE," which is incorporated by reference herein in its entirety for all purposes.

FIELD

The present disclosure relates generally to techniques for using communication devices to conduct ranging and localization.

BACKGROUND

Localization is the problem of determining the relative locations of electronic devices. The location of a mobile device can be determined relative to ranging devices using ranging techniques such as time of flight (ToF) or received signal strength indicator (RSSI). These techniques employ multiple ranging deices with synchronized clocks and known locations. Ranging measurements between the mobile device and these ranging devices can be used to triangulate the device's location. However, successful triangulation can be difficult to perform in a home environment because domestic customers may only own one device that can be used for determining a relative location. Accordingly, improvements to localization techniques are desirable.

BRIEF SUMMARY

Certain embodiments are directed to techniques (e.g., a device, a method, a memory or non-transitory computer readable medium storing code or instructions executable by one or more processors) for localization of a mobile device relative to a ranging device. The techniques can include methods for determining a mobile device's location using one or more of ranging measurements at dwell points and movement data. The ranging measurements and movement data can be cross referenced to determine the mobile device's location with reference to a ranging device.

The techniques can include a method for determining which a location of a mobile device within a building. The method can be performed by the mobile device. The mobile device can perform ranging with a ranging device to obtain ranging measurements over a period of time. The ranging measurements can provide distances to the ranging device. The mobile device can perform inertial measurements using one or more sensors over the period of time. The inertial measurements can include directional measurements of movement of the mobile device. The mobile device can identify a plurality of dwell points when the mobile device is stationary for at least a threshold amount of time. The dwell points can be identified using the ranging measurements, the inertial measurements, or both. Each of the plurality of dwell points can correspond to a distance from the ranging device. The mobile device can determine vectors of movement between at least a portion of the plurality of dwell points. The vectors of movement can be determined based on the inertial measurements when the mobile device is moving between dwell points. The mobile device can determine a first distance from the ranging device by performing a first ranging measurement with the ranging device. The first distance can correspond to a first dwell point. The mobile device can determine a first direction of movement by performing a first inertial measurement. The mobile device can determine a destination distance from the ranging device by performing a second ranging measurement with the ranging device. The destination distance can correspond to a destination dwell point. The destination distance can be matched to a distance of a dwell point of the plurality of dwell points. The mobile device can determine that the mobile device is at a second dwell point using the first vector of movement.

A better understanding of the nature and advantages of embodiments of the present invention may be gained with reference to the following detailed description and the accompanying drawings.

DETAILED DESCRIPTION OF THE INVENTION

Figure 1:
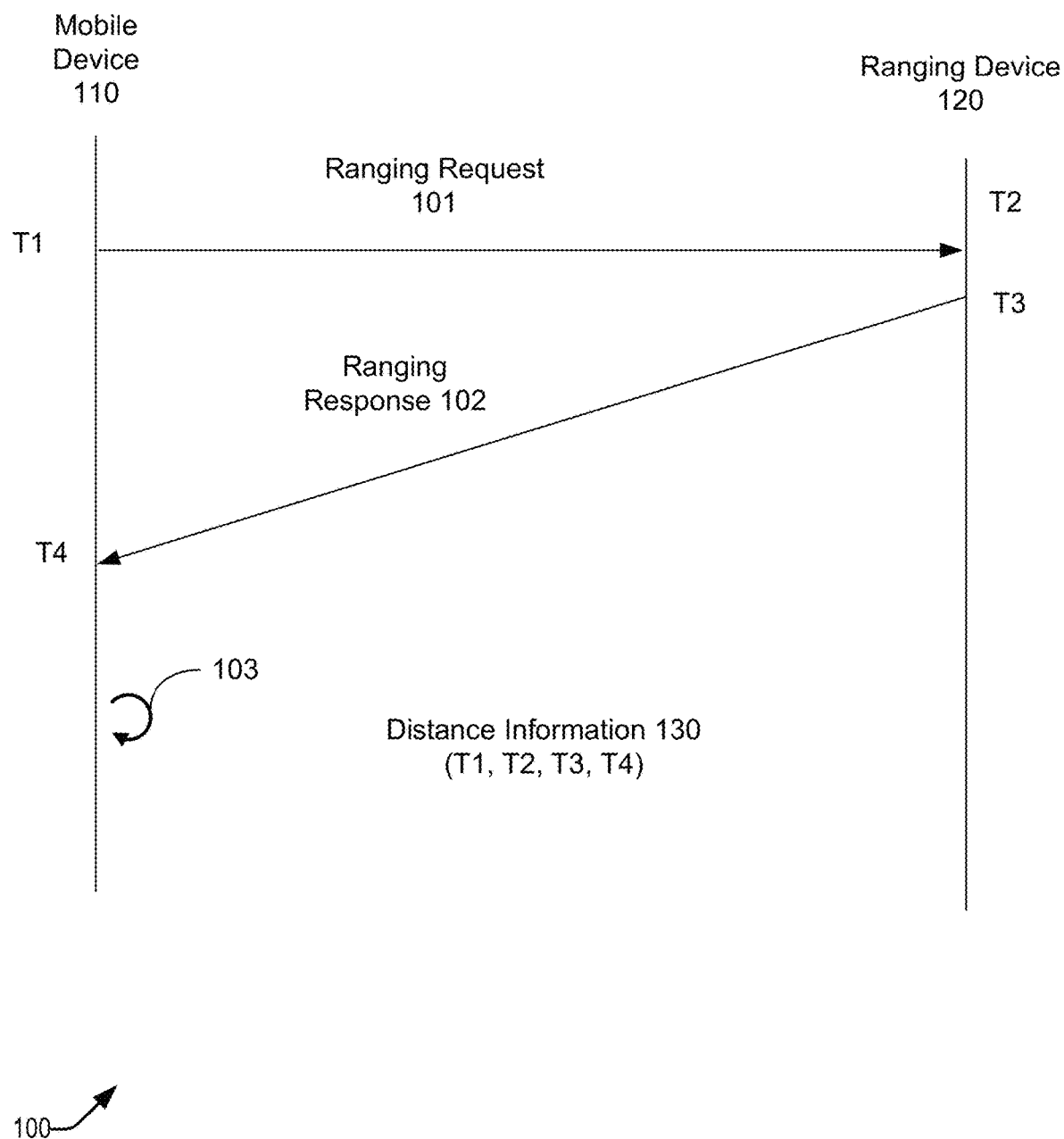
FIG. 1 shows a sequence diagram for performing a ranging measurement between an access device and a mobile device according to embodiments of the present disclosure.

Certain embodiments are directed to techniques (e.g., a device, a method, a memory or non-transitory computer readable medium storing code or instructions executable by one or more processors) for discovery or ranging techniques.

Localization techniques with ranging between an electronic device, such as a mobile device, and a single ranging device can be used to construct an emergent map of points of interest in the home environment. Instead of always tracking the mobile device's precise location using multiple ranging devices, the techniques can use points where the mobile device dwells (e.g., couch, bed, kitchen, etc.) and the general direction between these dwell points, e.g., as measured using one or more inertial movement sensors. The techniques can be used to create a simplified map where stops (and their general position relative to each other) are more important than a full-fidelity version of the map itself. The disclosed techniques reduce the number of devices required to create a functional map of a mobile device's location and these techniques do not require laborious infrastructure setup. In addition, the techniques can use minimum identifiable information to preserve the user's privacy.

Example techniques can use a single ranging device (e.g., an ultrawideband (UWB)-equipped device), such that the system could be readily adopted in the home. Ranging data (e.g., time of flight (ToF) data) between the ranging device and a mobile device equipped with UWB (e.g., a phone) can be aggregated to find the distance between the mobile device and the ranging device. Data from the mobile device can be used to determine when the mobile device has dwelled (i.e., where the device has spent a significant amount of time). Directional data from the device (e.g., inertial measurement units (IMUs)) can be aggregated to algorithmically disambiguate and locate the dwell positions from the dwell distances. The "dwell" spots can be used to build a personalized map of landmarks in the home environment, which can serve as a foundation for contextual services (e.g., turn on the kitchen lights when a user enters the room).

I. Ranging

In some embodiments, an electronic device such as a mobile device or ranging can include circuitry for performing ranging measurements. Such circuitry can include one or more dedicated antennas (e.g., 3) and circuitry for processing measured messages (e.g., signals). The ranging measurements can be performed using the time-of-flight of pulses between the two electronic devices (e.g., a mobile device and a ranging). In some implementations, the distance between devices can be measured using the received signal strength indication (RSSI) of a single pulse. In other implementations, a round-trip time (RTT) is used to determine distance information, e.g., for each of the antennas. In other implementations, a single-trip time in one direction can be used. The pulses may be formed using ultra-wideband (UWB) radio technology.

A. Received Signal Strength Indicator (RSSI)

Received signal strength indicator (RSSI) is a measure of the power in a received signal. One or more antennas in an electronics device's array can be configured to measure the received signal strength. The received signal strength can be represented as a negative number with arbitrary units that can vary between implementations. For example, the Institute of Electrical and Electronics Engineers (IEEE) 602.11 technical standard for implementing wireless area network communication and Bluetooth Low Energy (BLE) wireless personal area technology both use decibel-milliwatts (-dBm) as the units for received signal strength, however other units are contemplated.

A signal's strength can be determined with an electronic device's wireless communication antennas. Electronic devices often contain components for wireless communication and RSSI can allow for distance measurements without specialized hardware. To measure RSSI, a primary electronic device can transmit a signal that is received by one or more secondary electronic devices. The signal's power attenuates at a regular rate that can be used to determine a rough distance between the devices.

B. Time of Flight (ToF)

FIG. 1 shows a sequence diagram for performing a ranging measurement between a mobile device and a ranging device according to embodiments of the present disclosure. The mobile device can be a smartphone, a smartwatch, a tablet computer, a personal computer, a wearable computer, etc. The ranging device can be a smart speaker, a wireless networking router, a smart television, a streaming device, a personal computer, etc. Although FIG. 1 shows a single measurement, the process can be repeated to perform multiple measurements over a time interval as part of a ranging session, where such measurements can be averaged or otherwise analyzed to provide a single distance value, e.g., for each antenna. FIG. 1 illustrates a message sequence of a single-sided two-way ranging protocol. The techniques presented in this application are also applicable to other ranging protocols such as double-sided two way ranging.

A mobile device 110 can initiate a ranging measurement (operation) by transmitting a ranging request 101 to a ranging device 120 (e.g., a smart speaker, a smart television, a streaming device). Ranging request 101 can include a first set of one or more pulses. The ranging measurement can be performed using a ranging wireless protocol (e.g., UWB). The ranging measurement may be triggered in various ways, e.g., based on user input and/or authentication using another wireless protocol, e.g., Bluetooth low energy (BLE). In one example, ranging can start upon receiving certain information in an advertisement signal from a beacon device.

At T1, mobile device 110 transmits ranging request 101. At T2, ranging device 120 receives ranging request 101. T2 can be an average received time when multiple pulses are in the first set. ranging device 120 can be expecting ranging request 101 within a time window based on previous communications, e.g., using another wireless protocol. The ranging wireless protocol and the other wireless protocol can be synchronized so that ranging device 120 can turn on the ranging antenna(s) and associated circuitry for a specified time window, as opposed to leaving them on for an entire ranging session.

In response to receiving the ranging request 101, ranging device 120 can transmit ranging response 102. As shown, ranging response 102 is transmitted at time T3, e.g., a transmitted time of a pulse or an average transmission time for a set of pulses. T2 and T3 may also be a set of times for respective pulses. Ranging response 102 can include times T2 and T3 so that mobile device 110 can compute distance information. As an alternative, a delta between the two times (e.g., T3-T2) can be sent. The delta can be referred to as a reply time.

At T4, mobile device 110 can receive ranging response 102. Like the other times, T4 can be a single time value or a set of time values.

At 103, mobile device 110 computes distance information 130, which can have various units, such as distance units (e.g., meters) or as a time (e.g., milliseconds). Time can be equivalent to a distance with a proportionality factor corresponding to the speed of light. In some embodiments, a distance can be computed from a total round-trip time, which may equal T2-T1+T4-T3. More complex calculations can also be used, e.g., when the times correspond to sets of times for sets of pulses and when a frequency correction is implemented.

II. Dwell Points

Dwell points can correspond to locations within an environment where the mobile device "dwells", i.e., remains relatively stationary for a period of time. For instance, the locations can comprise areas around a home such as a bed, a living room, a sofa, a desk, a bathroom, a kitchen, etc. A mobile device may be relatively stationary if the distance to the ranging remains within a distance threshold and the device's movement, determined using IMU measurements, remains below a movement threshold.

The ranging and movement data can be combined with other mobile device data to determine whether the device is at a dwell. For instance, the orientation of a mobile device can suggest whether the user is at a dwell spot with a horizontal orientation indicating that the mobile device is resting at a dwell spot (e.g., placed on a table) and a vertical orientation suggesting that the user is not dwelling (e.g., the mobile device is in a walking user's pocket). In addition, whether the mobile device is charging may indicate whether the user, or mobile device, is at a dwell point because charging may be inconsistent with movement between dwell points.

A. Example Applications of Dwell Points

Dwell points can be used to determine a user's routine, and following a routine can help increase productivity, improve mental health, and establish healthy habits. Routine tasks often take place in specific places in a home; for example, a morning routine could consist of waking up in the bedroom, getting refreshed in the bathroom, having breakfast in the kitchen, and leaving via the front door. Existing approaches can require users to explicitly provide spatial information about the user's tasks/routine (e.g., room selection via a user interface) and the user may have to manually configure their home devices and services in order to teach their routine to the device. A device that can learn the user's routine (e.g., a series of dwell points) can provide spatial and temporal context and preemptively provide suggestions to the user as soon as a map of dwell points emerges. For example, devices that determines that it is in a living room (e.g., a dwell point) could pre-select devices (e.g., display TVs and speakers at the top of a list, or use dwell information to trigger automation). Furthermore, the device could determine underlying temporal patterns (e.g., high- or low-traffic dwell points) that the user may be unaware of, which could help support specific habit-forming goals (e.g., the mobile device could notify the user that they are less likely to use a workout application if the user streams a television show in the living room immediately after arriving home in the afternoon).

Dwell points can be used to create in place commands (e.g., "take X action when I am at Y location"). Typically, when a user needs to command an agent (e.g., a robot or smart assistant), the user navigates a user interface or explicitly mention a location to a device (e.g., "robot vacuum, clean the bedroom"). With dwell points, a user can leverage indoor location information to enable contextual commands (e.g., references such as "here" or "next room"). For example, users could tell a robot vacuum to "clean here", or "ignore this room." Similarly, a user's dwell position could also trigger specific context-relevant settings, such as meeting time or usage profiles (e.g., focus modes).

Dwell points can also be used to coordinate activities in a multi-user setting. For example, in a household or a co-living community, members often spend time in different areas. This issue has been exacerbated with the introduction of personal devices; despite being in close proximity with each other, members more often than ever focus on their own devices and rarely spend time together in the same space. In response, similar to the concept of recording a device's screentime, dwell points can be used to introduce the idea of "group time," where mobile devices can quantify the amount of time each user in a group (e.g., family) is within the same physical space, in a privacy-preserving manner. The dwell points can be used to correlate location information among each user to help quantify and drive novel experiences related to "group time."

B. Determine Radii

Ranging measurements can be used to determine the linear distance between the mobile device and the ranging device. A radius around the ranging device can be calculated from this linear distance. The calculated radius, or dwell circle, can include a dwell point, but it may be difficult to distinguish between two dwell points that are a similar distance from the ranging device, i.e., lie on the same dwell circle.

Figure 2:
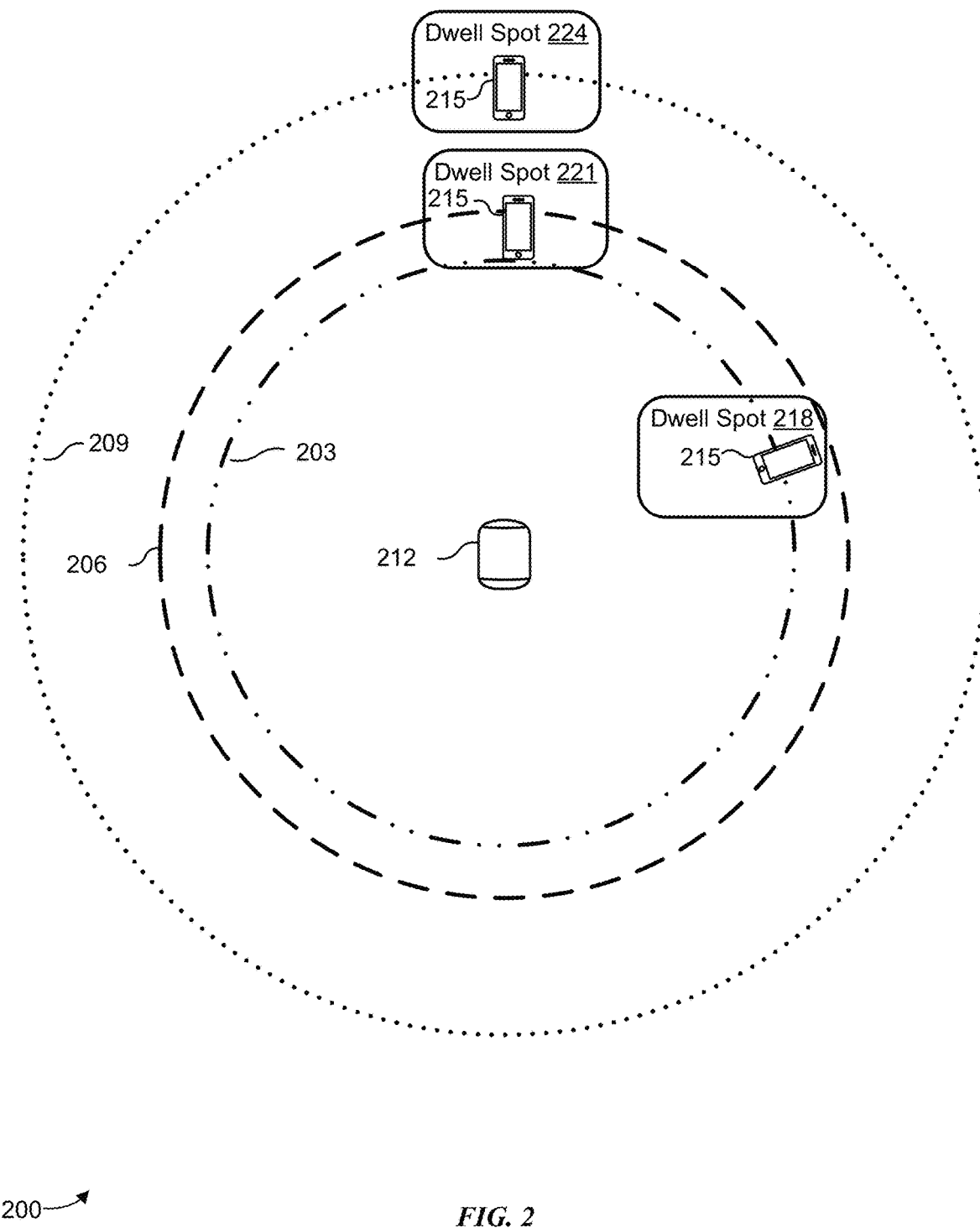
FIG. 2 shows a simplified diagram of a ranging device and dwell circles according to at least one embodiment.

FIG. 2 shows a simplified diagram 200 of a ranging device and dwell circles according to at least one embodiment. The dwell circle 203, dwell circle 206, or dwell circle 209 can be circles around the ranging device 212 that were calculated using ranging measurements that were performed while the mobile device was stationary for a threshold amount of time. As examples, the threshold amount of time can be 10 seconds, 30 seconds, 1 minute, 2 minutes, 5 minutes, 10 minutes, 15 minutes, 30 minutes, or an hour. A mobile device can be stationary if the measurements from the mobile device's sensors are below a threshold. The radius of the dwell circles can be the distance between the ranging device 212 and a mobile device 215. The distance can be calculated using ranging techniques such as ToF or RSSI. Ranging with two devices (e.g., between the ranging device 212 and mobile device 215) can determine a linear distance between the devices, but such ranging measurements may not provide information about the two dimensional or three-dimensional positions of the devices. With a single distance measurement, a mobile device such as mobile device 215, may be located to be a certain distance from ranging device 212 (i.e., corresponding to a circle), although the exact location could be anywhere in the circle around the ranging device 212.

A single linear distance can be sufficient to distinguish between different dwell points 218, dwell point 221, or dwell point 224 if the dwell points are located at different distances from the ranging device 212. For instance, a single distance can be used to determine when the mobile device 215 is in dwell point 218 or in dwell point 224. When mobile device 215 is in dwell point 218, the device is located on dwell circle 203. When the mobile device 215 is in dwell point 224, the device is located on dwell circle 209. The difference between the radii of the dwell circle 203 and dwell circle 209 is sufficiently large that the location of mobile devices 215 can be determined. A single distance measurement may not be sufficient to determine the two dimensional or three-dimensional location of the mobile devices (e.g., on a coordinate grid), but the measurement may allow the mobile devices to distinguish between dwell point 218 and dwell point 224.

However, a single distance between ranging device 212 and a mobile device may not be sufficient to distinguish between dwell points in all circumstances. Ranging measurements can have a margin of error caused by noise, environmental factors, and ranging errors such as multipath errors or body blocking. The location of mobile device 215 may not be determined if the distance from the ranging device 212 to two or more dwell points are within this margin of error. For example, a single distance between ranging device 212 and mobile device 215 may not be sufficient to determine whether mobile device 215 is located in dwell point 218 or dwell point 221. The distance between the two dwell points such as dwell point 218 or dwell point 221 on a coordinate plane may be substantial but since their distances relative to ranging device 212 are similar, it may not be possible to determine which dwell point contains mobile device 215.

A. Movement Among Dwell Points

A linear distance between a mobile device and a ranging device may not provide sufficient information to determine whether the mobile device is located at a particular dwell point. However, movement information from the mobile device's sensors can be used to disambiguate the device's location. For example, movement information can indicate whether a mobile device is resting or traveling between dwell points. Distance and direction information for a traveling mobile device, calculated using the movement information, can be used to distinguish between dwell points.

Figure 3:
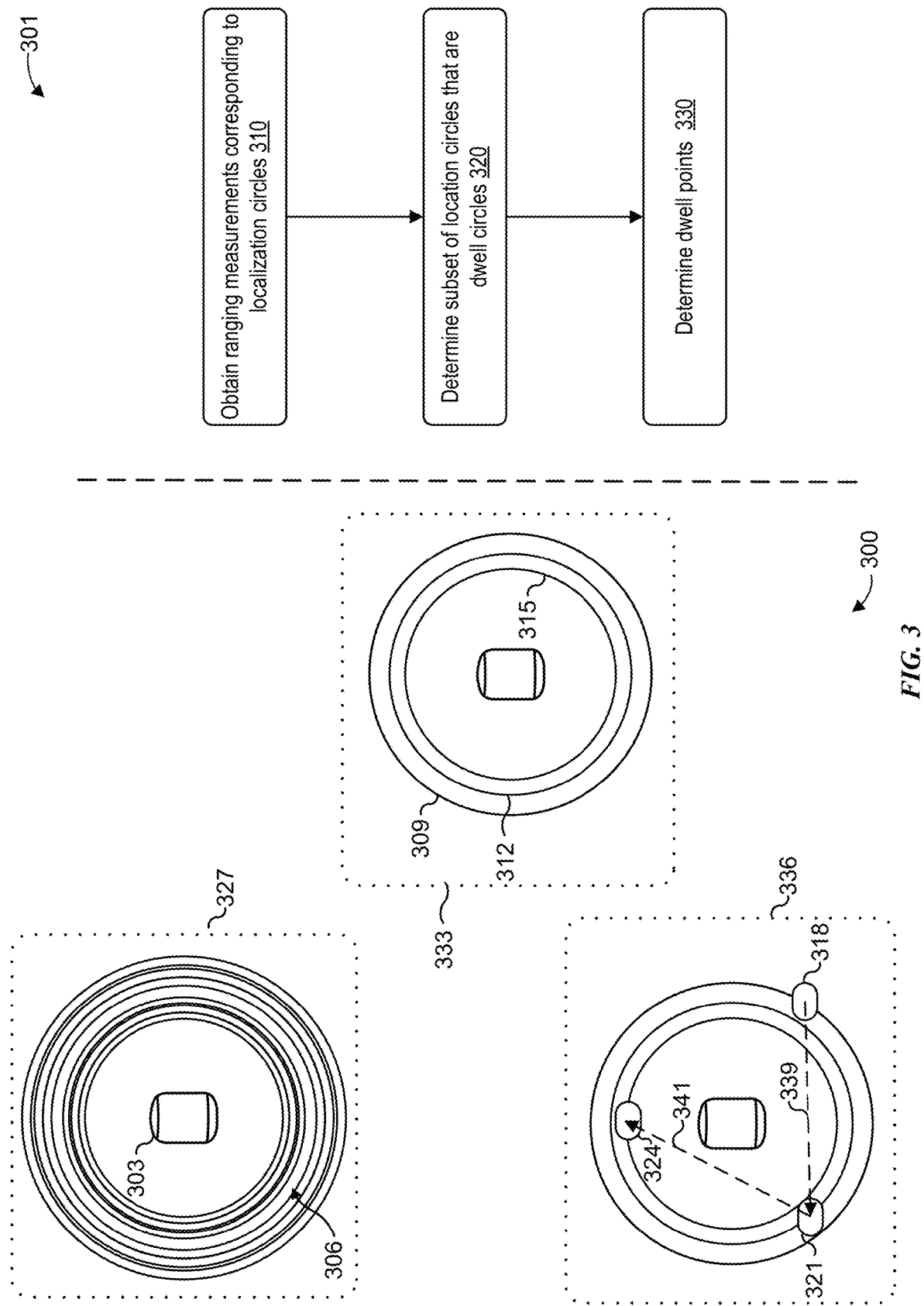
FIG. 3 shows a simplified diagram of a method for distinguishing between dwell points according to at least one embodiment.

FIG. 3 shows a simplified diagram 300 and a method 301 for distinguishing between dwell points according to at least one embodiment. Turning to method 301 in greater detail and with reference to section 327 of diagram 300, at block 310, ranging measurements can be obtained. The ranging measurements can be obtained by calculating the time of flight or received signal strength indicator for ultrawideband messages sent between a ranging device 303 and a mobile device. The ranging measurements can be used to calculate a distance between ranging device 303 and the mobile device. This distance can be a linear distance between the devices however, the ranging measurements may not provide information about the orientation or relative positions of ranging device 303 and the mobile device. Accordingly, the mobile device's position can be localized to a localization circle (e.g., localization circles 306) around ranging device 303. The localization circle can be a circle with a radius equal to the distance calculated using the ranging measurements while dwell circles can be a subset of the localization circles where movement data from a mobile device's inertial movement unit indicates that the device is not moving, or the movement is below a threshold.

Ranging measurements are subject to errors, and the raw ranging measurements between the mobile device and the ranging device may have to be processed before the mobile device's position can be localized to a localization circle. For instance, body blocking can cause uncertainty in RSSI measurements while multipath errors can cause ToF measurement errors. These errors can be smoothed and filtered using filters such as a Kalman filter, an extended Kalman filter, an unscented Kalman filter, a non-linear complementary filter, a linear complementary filter, or a dynamic complementary filter with a constant velocity model. The smoothed and filtered ranging measurements are linear distances from the ranging device that can be used as the radii for localization circles 306.

At block 320 and with reference to section 333 of diagram 300, dwell circles can be determined using the localization circles 306 from 310. Identifying a dwell circle can mean selecting one or more of the localization circles 306 from 310 using data from the mobile device's sensors. Dwell circle 309, dwell circle 312, and dwell circle 315 can be identified from the localization circles 306 using movement data from an inertial movement unit in a mobile device. For example, a subset of the localization circles 306 may be selected as a dwell circle if the movement data during ranging measurements corresponding to the localization circles shows that the mobile device is not moving, if the mobile device's movement is below a threshold, if the mobile device does not move for a time period, or if the mobile device's movement is below a threshold for a time period. The time period can be 1 second (s), 2 s, 3 s, 4 s, 5 s, 10 s, 20 s, 30 s, 45 s, 1 minute (min), 2 min, 3 min, 5 min, 10 min, 20 min, or 30 min. The subset of localization circles 306 that are selected may be averaged to determine a dwell circle and the radius of the dwell circle can be a mean median or mode of the subset of localization circles.

The orientation of the mobile device may be used to identify a subset of localization circles 306 as dwell circles, and, for example, localization circles may be selected as part of a subset if the ranging measurements corresponding to the localization circles were performed while the mobile device is in a horizontal orientation (e.g., with the mobile device's screen parallel to the floor). Other information from the mobile device's sensors may be used to select a subset of localization circles and a subset of the localization circles 306 can be selected if the ranging measurements corresponding to the localization circles were made while the mobile device was connected to a power source (e.g., charging).

Ranging measurements can correspond to a localization circle if the ranging measurements were used to calculate the distance between the localization circle and the ranging device 303. Localization circles 306 may be selected as part of a subset if the mobile device repeatedly returns to a location as shown by a finding that the number of localization circles within a specified range is above a threshold. In addition, interactions between the mobile device and other devices can be used to identify a subset of the localization circles 306. Localization circles 306 may be identified in a subset if the ranging measurements corresponding to the circles were made while the mobile device was interacting with devices. For example, the localization circles 306 may be included in a subset representing a living room if all of the localization circles correspond to ranging measurements that were made while the mobile device was sending commands to a streaming device (e.g., a smart television). Interactions with applications running on the mobile device can also be used to select a subset of localization circles 306. As an example, localization circles may be grouped together in a subset if a cooking application is open while the ranging measurements, corresponding to the localization circles 306, were performed.

At block 330 and with reference to section 336 of diagram 300, the dwell points can be determined. Movement data (e.g., inertial movement units (IMUS) from the mobile device's sensors can be used to determine dwell points. For example, orientation data from the mobile device's magnetometer and distance data from the mobile device's pedometer (e.g., accelerometer) can be used to determine the dwell points because a mobile device can be at a dwell point (e.g., dwelling) when the mobile device's movement data, or the change in the movement data, is below a threshold. When the mobile device's movement data is above the threshold, the mobile device may be moving between dwell points, such as dwell point 318, dwell point 321, or dwell point 324, and the device's the orientation and movement rate can be recorded.

The mobile device's movement from one dwell point to another dwell point is referred to as a journey. A journey, such as journey 339 between dwell point 318 and dwell point 321 or journey 341 between dwell point 321 and dwell point 324, can comprise the direction (e.g., orientation or trajectory) and distance measured by the mobile device as it travels between a first dwell point and a second dwell point. The mobile device can record the orientation and movement rate for a journey (e.g., a continuous time period during which the device's movement data exceeds a threshold). The direction can be represented as a rate vector representing a weighted average of the direction of movement and rate of movement during the continuous time period.

The rate vector for a journey can be used to calculate the distance between dwell points. For example, the distance can be calculated by multiplying the time period by the magnitude of the of the rate vector. The orientation of the rate vector can be the direction of movement during the journey (e.g., between dwell points). This direction and distance data can be used to determine the relative positions of potential dwell points. The dwell circles corresponding to the potential dwell points are also known from ranging data measured at 320 and the relative positions and dwell circles can be cross-referenced to identify dwell point 318, dwell point 321, and dwell point 324. Cross referencing the relative positions and dwell circles is described in greater detail below in reference to FIG. 4.

B. Example Technique to Distinguish Between Dwell Points

Whether a mobile device is at a dwell point can be determined by solving a system of equations according to the example technique described below. In addition, this example technique can be used to distinguish between potential dwell points when the dwell circles for the potential dwell points have similar radii (e.g., the lengths of radii are within a threshold).

Figure 4C:
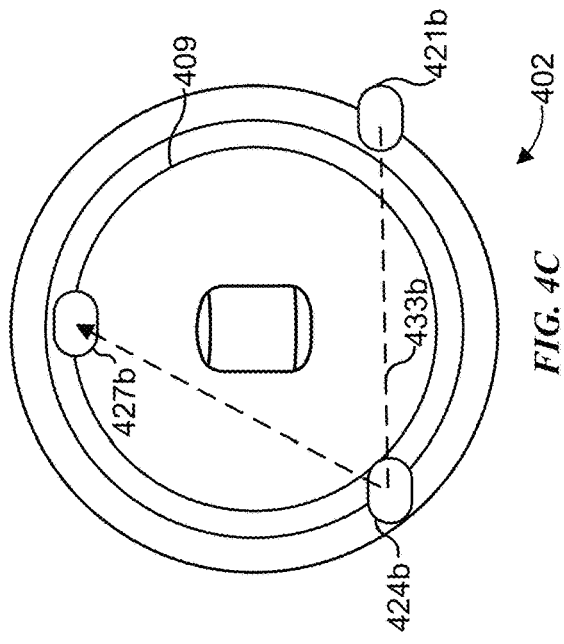
FIG. 4A-4C show simplified diagrams of potential locations for an unknown dwell point according to at least one embodiment.
Figure 4B:
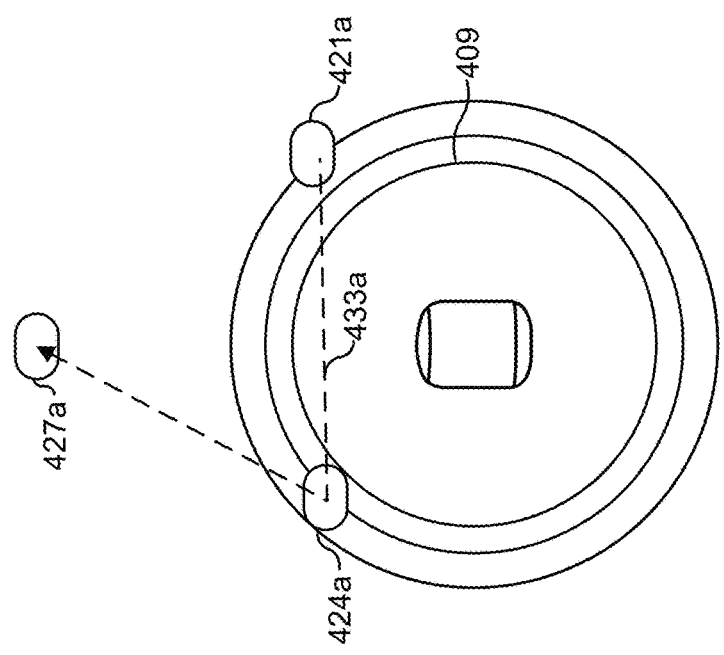
Figure 4A:
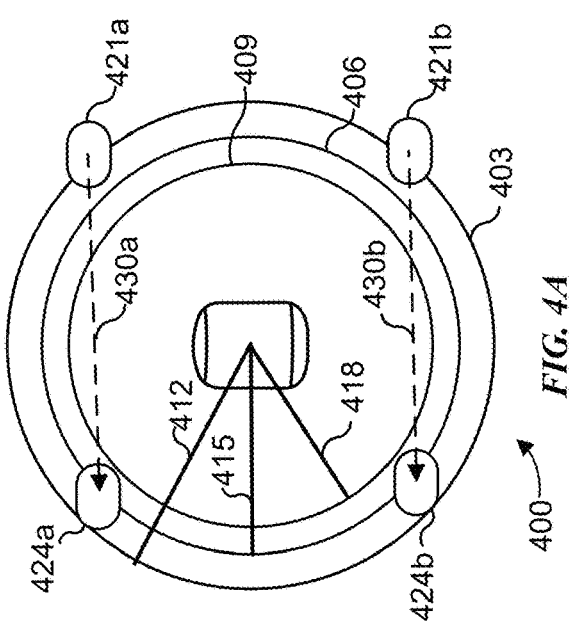

FIGS. 4A-4C show simplified diagrams of potential locations for an unknown dwell point according to at least one embodiment. The equations described below can be used to calculate a vector of movement and the intersection of the vector of movement and dwell circles can be used to distinguish between two dwell points with dwell circles that have similar radii. The radii for dwell circles can be determined through ranging measurements between the mobile device and the ranging device, while the vector of movement, with the distance and orientation for the nth journey between potential dwell points, can be determined using the following equation:

$$(x_n, y_n) = ([x_{n-1} + u_{xn} * t_n], [y_{n-1} + u_{yn} * t_n]) \quad (1)$$

Where $(x_{n-1}, y_{n-1})$ are the coordinates of the origin of the nth journey, $(x_n, y_n)$ are the coordinates of the destination of the nth journey, $u_{xn}$ is the x-component of a rate vector for the nth journey, $u_{yn}$ is the y-component of a rate vector for the nth journey, and to is the travel time (e.g., the time spent traveling between the first location and the second location on the nth journey).

A rate vector is a vector that represents a direction and a rate of movement per unit of time. Rate vectors can be calculated from inertial movement units (IMUS) measured by the mobile device. The direction of the rate vector can be determined, for example, with a magnetometer, the rate of travel of the rate vector can be determined by calculating gait information calculated with an accelerometer and the mobile device user's anthropometric measurement extrapolated from the user's height. The rate vector can be determined by summing the average magnetometer readings and average accelerometer readings made during the nth journey. The origin can correspond to a first dwell circle and the destination can correspond to a second dwell circle. In some circumstances, the origin or the destination can correspond to a ranging and the coordinates for the origin or destination can be set to (0, 0).

Equation (1) can be used to determine a vector of movement with a direction and distance between an origin $(x_{n-1}, y_{n-1})$ and a destination $(x_n, y_n)$ for the nth journey between dwell points. However, equation (1) may not be sufficient to determine the coordinates of the first location or second location without additional information. Both locations can correspond to dwell circles so equation (1), equations (2), equation (3), equation (4), and equation (5) can form a system of equations that can be solved to determine the destination (e.g., the intersection between the dwell vector and the dwell circle corresponding to the destination):

$$x_{n-1} = \sqrt{r_{n-1}^2 - y_{n-1}^2} \quad (2)$$

$$y_{n-1} = \sqrt{r_{n-1}^2 - x_{n-1}^2} \quad (3)$$

$$x_n = \sqrt{r_n^2 - y_n^2} \quad (4)$$

$$y_n = \sqrt{r_n^2 - x_n^2} \quad (5)$$

Where $(x_{n-1}, y_{n-1})$ are the coordinates of the origin, $(x_n, y_n)$ are the coordinates of the destination, $r_{n-1}$ is the radius of the dwell circle corresponding to the origin, and rn is the radius of the dwell circle corresponding to the destination. The radii can be calculated with ranging measurements performed by the mobile device during the journey. The system of equations may be expanded depending on the number of potential dwell points.

Turning to FIG. 4A in greater detail, diagram 400 shows a first dwell circle 403, a second dwell circle 406, a third dwell circle 409, a first radius 412 corresponding to the first dwell circle 403, a second radius 415 corresponding to the second dwell circle 406, and a third radius 418 corresponding to the third dwell circle 409. Each dwell circle can be calculated using a linear distance (e.g., radius) measured using ranging measurements between the mobile device and the anchor device. The locations of a first dwell point and a second dwell point can be determined by solving a system of equations comprising equations based on equation (1), equation (2), equation (3), equation (4), and equation (5). The system of equations can be as follows:

$$(x_1, y_1) = ([x_0 + u_{x1} * t_1], [y_0 + u_{y1} * t_1]) \quad (6)$$

$$x_0 = \sqrt{r_0^2 - y_0^2} \quad (7)$$

$$y_0 = \sqrt{r_0^2 - x_0^2} \quad (8)$$

$$x_1 = \sqrt{r_1^2 - y_1^2} \quad (9)$$

$$y_1 = \sqrt{r_1^2 - x_1^2} \quad (10)$$

Where $(x_0, y_0)$ are the coordinates of the origin (e.g., first dwell point) of the 1st journey, $(x_1, y_1)$ are the coordinates of the destination (e.g., second dwell point) of the 1st journey, $u_{x1}$ is the x-component of a rate vector for the 1st journey, $u_{y1}$ is the y-component of a rate vector for the 1st journey, and $t_1$ is the time spent traveling between the first dwell point and the second dwell point on the 1st journey. In addition, $(x_0, y_0)$ are the coordinates of the 1st journey's origin, $(x_1, y_1)$ are the coordinates of the 1st journey's destination, $r_0$ is the radius of the dwell circle corresponding to the first location (e.g., first radius 412), and $r_1$ is the radius of the dwell circle corresponding to the second location (e.g., second radius 415).

Diagram 400 shows two potential first dwell points 421a-421b and two potential second dwell points 424a-424b. The potential dwell points, including the third potential dwell points 427a-427b discussed below, can be locations within a building, home, or other area. For instance, the first potential dwell points 421a-421b can be a bedroom, the second potential dwell points 424a-424b, can be a living room, and third potential dwell points 427a-427b can be a bathroom. Other dwell points are contemplated such as a kitchen, an office, a reception desk, a conference room, a storage area, a garage, a vendor in a stadium/shopping area, a subdivision of a room, a subdivision of a building, an outdoor area such as an athletic field, an exhibit in a museum, an attraction in a theme park, a water fountain, or any distinct area where a user with a mobile device may dwell for a period of time.

A mobile device may move between the dwell points. Journeys between the dwell points are shown as dotted lines with arrows and journey 430a is between first dwell points 421a-421b while journey 430b is between potential dwell points 424a-424b. It is not possible to distinguish between the two potential first dwell points 421a-421b or the two potential second dwell points 424a-424b because the system of equations has two possible solutions caused by two real roots for any one of equations (2)-(5) or (7)-(10). Each potential solution may be valid because the two potential first dwell points 421a-421b are located on the first dwell circle 403 and the two potential second dwell points 424a-424b are located on the second dwell circle 406. The ambiguity may be resolved by adding additional data from a second journey from the second dwell point to a third dwell point.

Turning to FIG. 4B in greater detail, diagram 401 shows a potential first dwell point 421a, a potential second dwell point 424a, and a potential third dwell point 427a. These dwell points are connected by a journey 433a. The third potential dwell point can be determined using orientation and distance information for a second journey from the second dwell point to the third dwell point. However, the potential third dwell point 427a can be excluded because the potential third dwell point is not located on the third dwell circle 409.

Turning to FIG. 4C in greater detail, diagram 402 shows a potential first dwell point 421b, a potential second dwell point 424b, and a potential third dwell point 427b. These potential dwell points are connected by a journey 433b. The third potential dwell point can be determined using orientation and distance information for a second journey from the second dwell point to the third dwell point. In this case, the potential third dwell point 427b can be considered valid because the potential third dwell point is located on the third dwell circle 409. In some embodiments, more dwell points are contemplated such as 3 dwell points, 4 dwell points, 5 dwell points, 10 dwell points, 20 dwell points, 30 dwell points, or 40 dwell points.

III. Locating Dwell Points

Figure 5:
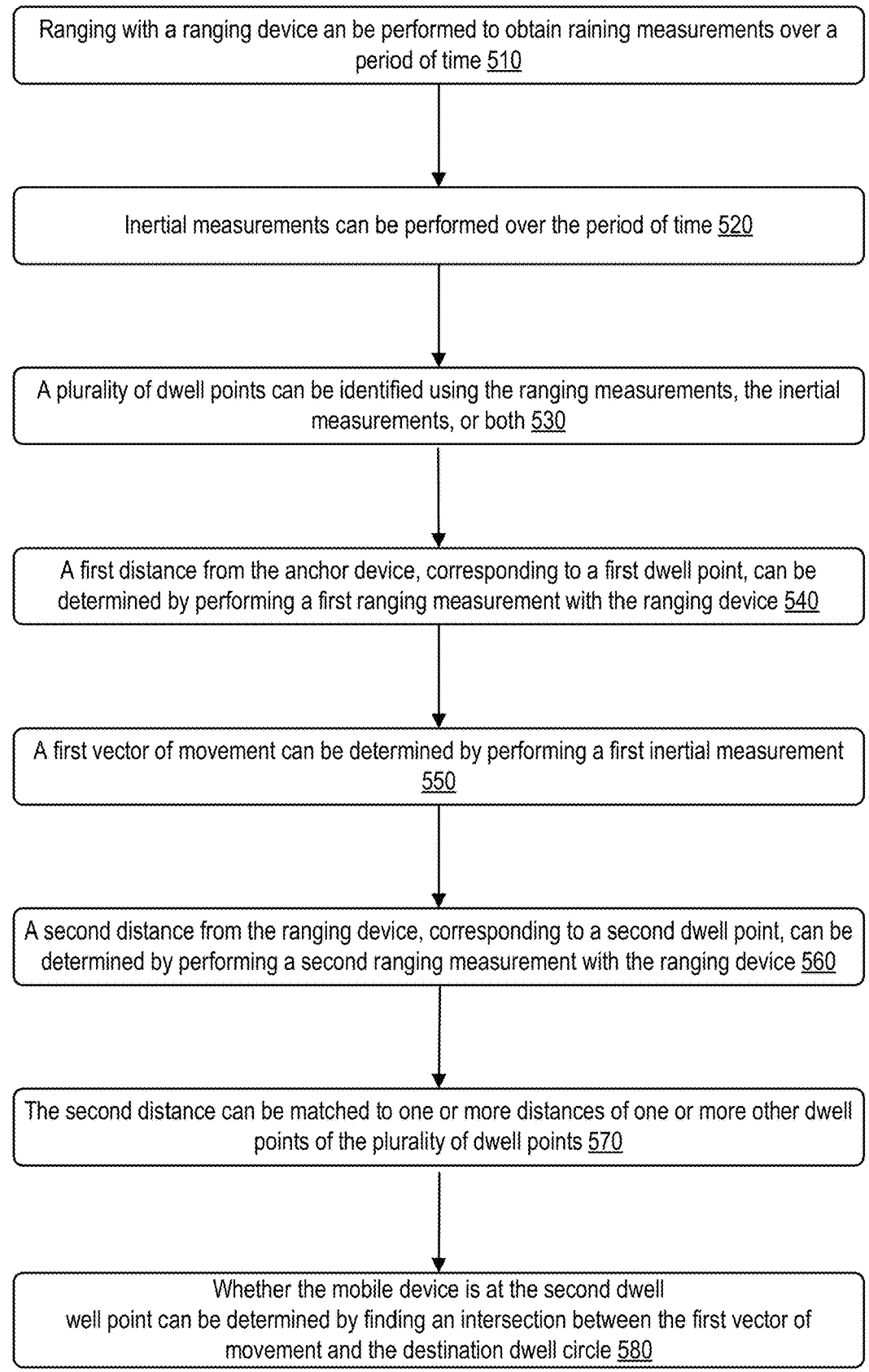
FIG. 5 is a flowchart illustrating a method for performing ranging to identify the location of dwell points relative to a ranging device according to at least one embodiment.

FIG. 5 is a flowchart illustrating a method 500 for performing ranging to identify the location of dwell points relative to a ranging device according to at least one embodiment. In some implementations, one or more method blocks of FIG. 5 may be performed by an electronic device (e.g., mobile device 110, ranging device 120, ranging device 212, mobile device 215, ranging device 303, mobile device 600, electronic device 700). In some implementations, one or more method blocks of FIG. 5 may be performed by another device or a group of devices separate from or including the electronic device.

Additionally, or alternatively, one or more method blocks of FIG. 5 may be performed by one or more components of an electronic device (e.g., mobile device 110, ranging device 120, ranging device 212, mobile device 215, ranging device 303, mobile device 600, mobile device 700), such as always-on processor (AOP) 630, Bluetooth Controller (BTC) 635, application processor 640, processor 618, computer readable medium 602, input/output (I/O) subsystem 606, ultra-wideband (UWB) circuitry 615, BT/WiFi circuitry 625, wireless circuitry 608, etc.

At block 510, ranging can be performed with a ranging device to obtain ranging measurements over a period of time. The measurements can be performed by a mobile device such as a smartphone, a smartwatch, a tablet computer, a laptop computer, and the like. The ranging measurements can provide distances between the ranging device and the mobile device. The period of time can be 10 min, 30 min, 1 hour, 2 hours, 3 hours, 6 hours, 12 hours 18 hours, 1 day, 2 days, 3, days, 4 days, 5 days, 6 days, 1 week, 2 weeks, or 1 month.

At block 520, inertial measurements can be performed over the period of time. In various embodiments, the period of time can be the period of time from 510 or the period of time can be shorter or longer than the period of time in 510. The inertial measurements can include directional measurements of the movement of the mobile device. The inertial measurements can be determined using one or more sensors of the mobile device (e.g., a compass, a magnetometer, an accelerometer, a gyroscope, etc.).

At block 530, a plurality of dwell points can be identified using the ranging measurements or the inertial measurements. The ranging measurements can be the ranging measurements from 510 and the inertial measurements can be the inertial measurements from 520. The dwell points can be identified if the mobile device is stationary for at least a threshold amount of time (e.g., 1 second (s), 5 s, 10 s, 20 s, 30 s, 45 s, 1 minute (min), 2 min, 3 min, 5 min, 10 min, 15 min, 20 min, 30 min, 45 min, 1 hour, 2 hours, 3 hours, 4 hours, 5 hours, or 6 hours.

At block 540, a first distance from the ranging device can be determined. The first distance can correspond to a dwell point, and the dwell point can be determined by a first ranging measurement between the mobile device and the ranging device. The first measurement can be multiple ranging measurements that are preformed using one or more ranging techniques such as time of flight (ToF), received signal strength indicator (RSSI) measurements, or round-trip time (RTT) measurements. The ranging measurements can be performed using ultrawideband (UWB) signals. The first dwell point can have a known location, and, for instance, the first dwell point can be the ranging.

At block 550, a first vector of movement can be determined by performing a first inertial measurement. The inertial measurement can be performed by one or more sensors of the mobile device. Sensors can include accelerometers, compass, gyrometer, pressure sensors, audio sensors, light sensors, barometers, and the like. The direction of movement can be determined by averaging IMUs made by the mobile device during a journey between the first dwell point and the second dwell point. The first vector of movement can be defined by equation (1).

At block 560, a destination distance from the ranging device can be determined. The destination distance can correspond to a destination dwell point. The destination distance can be determined by performing a second ranging measurement with the ranging device. The second ranging measurement can be multiple ranging measurements that are preformed using one or more ranging techniques such as time of flight (ToF), received signal strength indicator (RSSI) measurements, or round-trip time (RTT) measurements. The ranging measurements can be performed using ultrawideband (UWB) signals.

At block 570, the destination distance can be matched to a distance of a dwell point of the plurality of dwell points. In some implementations, the destination distance can be matched to one or more distances of one or more other dwell points of the plurality of dwell points. The destination distance and the distance, or one or more distances, can be matched if the destination distance and the one or more distances are within a threshold (e.g., 1 centimeter (cm), 5 cm, 10 cm, 20 cm, 30 cm, 40 cm, 50 cm, 1 meter (m), 2 m, 3 m, 4 m, 5 m.

At block 580, whether the mobile device is at the second dwell point can be determined using the first vector of movement. The first vector of movement can be used to find the destination dwell point by finding the intersection of the vector of movement and the dwell circle. The intersection can be found by solving a system of equations consisting of equation (1)-equation (5) for $x_n$ and $y_n$. The mobile device may be determined to be at a third dwell point if it is determined that the device is not at the second dwell point. The mobile device can be determined to be at the third dwell point using the same techniques that can be used to determine that the mobile device is not at the second dwell point.

IV. Mobile Device for Performing Ranging

Figure 6:
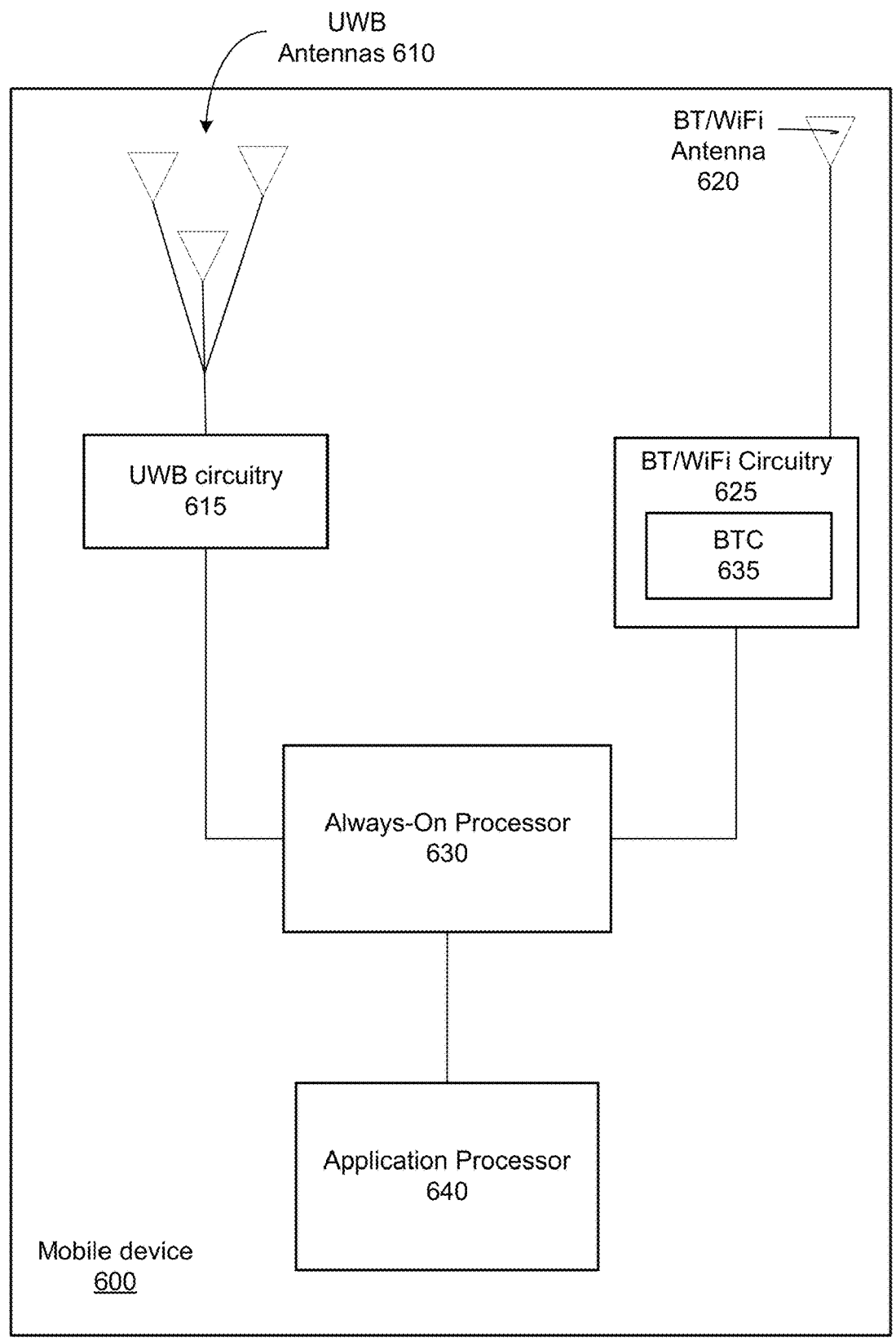
FIG. 6 is a block diagram of components of a mobile device operable to perform ranging according to embodiments of the present disclosure.

FIG. 6 is a block diagram of components of a mobile device 600 operable to perform ranging according to embodiments of the present disclosure. Mobile device 600 includes antennas for at least two different wireless protocols, as described above. The first wireless protocol (e.g., Bluetooth) may be used for authentication and exchanging ranging settings. The second wireless protocol (e.g., UWB) may be used for performing ranging with another mobile device.

As shown, mobile device 600 includes UWB antennas 610 for performing ranging. UWB antennas 610 are connected to UWB circuitry 615 for analyzing detected messages from UWB antennas 610. In some embodiments, mobile device 600 includes three or more UWB antennas, e.g., for performing triangulation. The different UWB antennas can have different orientations, e.g., two in one direction and a third in another direction. The orientations of the UWB antennas can define a field of view for ranging. As an example, the field of view can span 120 degrees. Such regulation can allow a determination of which direction a user is pointing a device relative to one or more other nearby devices. The field of view may include any one or more of pitch, yaw, or roll angles.

UWB circuitry 615 can communicate with an always-on processor (AOP) 630, which can perform further processing using information from UWB messages. For example, AOP 630 can perform the ranging calculations using timing data provided by UWB circuitry 615. AOP 630 and other circuits of the device can include dedicated circuitry and/or configurable circuitry, e.g., via firmware or other software.

As shown, mobile device 600 also includes Bluetooth (BT)/Wi-Fi antenna 620 for communicating data with other devices. BT/Wi-Fi antenna 620 is connected to BT/Wi-Fi circuitry 625 for analyzing detected messages from BT/Wi-Fi antenna 620. For example, BT/Wi-Fi circuitry 625 can parse messages to obtain data (e.g., an authentication tag), which can be sent on to AOP 630. In some embodiments, AOP 630 can perform authentication using an authentication tag. Thus, AOP 630 can store or retrieve a list of authentication tags for which to compare a received tag against, as part of an authentication process. In some implementations, such functionality could be achieved by BT/Wi-Fi circuitry 625.

In other embodiments, UWB circuitry 615 and BT/Wi-Fi circuitry 625 can alternatively or in addition be connected to application processor 640, which can perform similar functionality as AOP 630. Application processor 640 typically requires more power than AOP 630, and thus power can be saved by AOP 630 handling certain functionality, so that application processor 640 can remain in a sleep state, e.g., an off state. As an example, application processor 640 can be used for communicating audio or video using BT/Wi-Fi, while AOP 630 can coordinate transmission of such content and communication between UWB circuitry 615 and BT/Wi-Fi circuitry 625. For instance, AOP 630 can coordinate timing of UWB messages relative to BT advertisements.

To perform ranging, BT/Wi-Fi circuitry 625 can analyze an advertisement message from another device to determine that the other device wants to perform ranging, e.g., as part of a process for sharing content. BT/Wi-Fi circuitry 625 can communicate this notification to AOP 630, which can schedule UWB circuitry 615 to be ready to detect UWB messages from the other device.

For the device initiating ranging, its AOP can perform the ranging calculations. Further, the AOP can monitor changes in distance between the other devices. For example, AOP 630 can compare the distance to a threshold value and provide an alert when the distance exceeds a threshold, or potentially provide a reminder when the two devices become sufficiently close. An example of the former might be when a parent wants to be alerted when a child (and presumably the child's device) is too far away. An example of the latter might be when a person wants to be reminded to bring up something when talking to a user of the other device. Such monitoring by the AOP can reduce power consumption by the application processor.

V. Example Device

Figure 7:
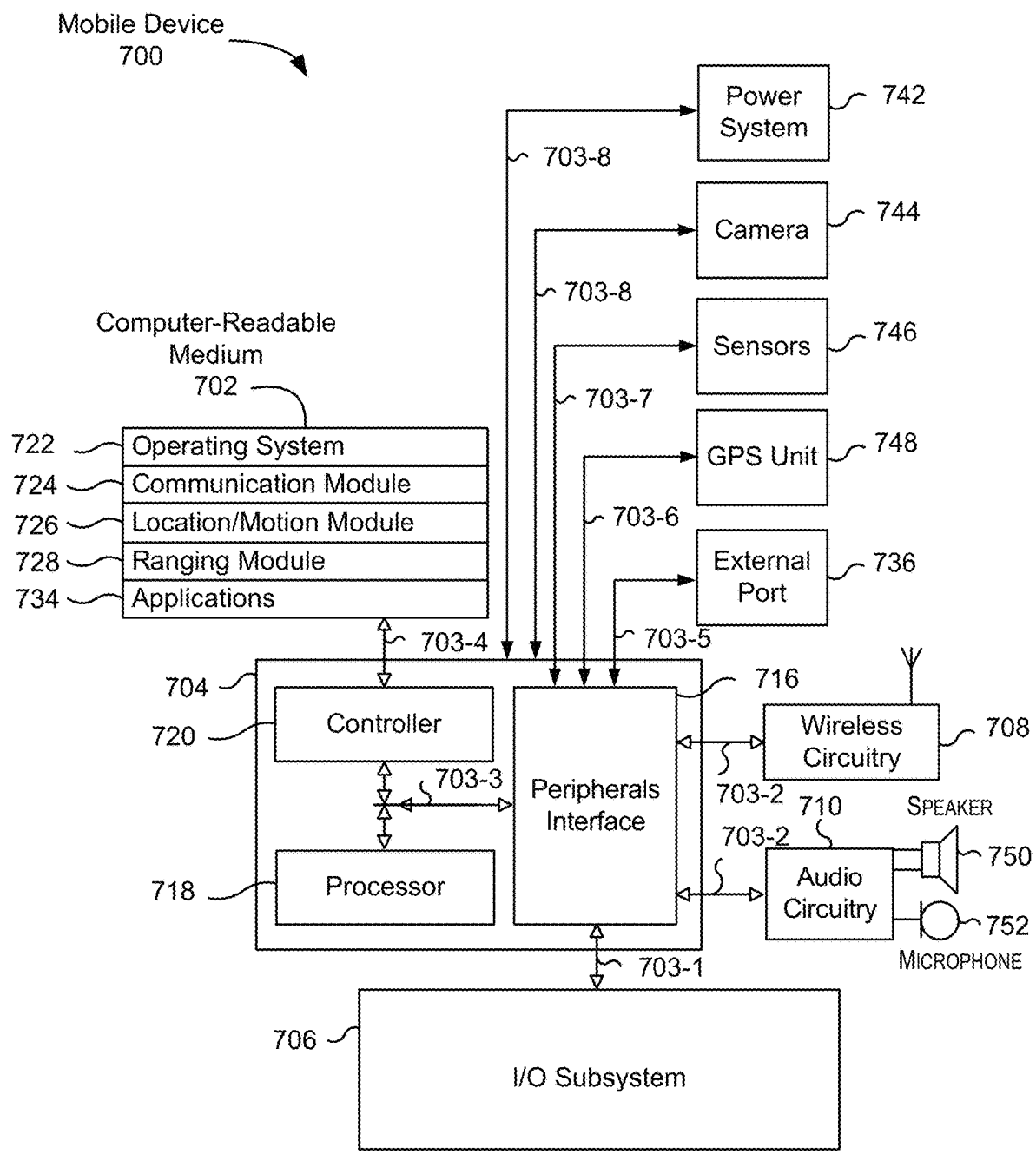
FIG. 7 is a block diagram of an example electronic device according to at least one embodiment.

FIG. 7 is a block diagram of an example electronic device 700 according to at least one embodiment. Device 700 generally includes computer-readable medium 702, a processing system 704, an Input/Output (I/O) subsystem 706, wireless circuitry 708, and audio circuitry 710 including speaker 712 and microphone 714. These components may be coupled by one or more communication buses or signal lines 703. Device 700 can be any portable electronic device, including a handheld computer, a tablet computer, a mobile phone, laptop computer, tablet device, media player, personal digital assistant (PDA), a key fob, a car key, an access card, a multifunction device, a mobile phone, a portable gaming device, a headset, or the like, including a combination of two or more of these items.

it should be apparent that the architecture shown in FIG. 7 is only one example of an architecture for device 700, and that device 700 can have more or fewer components than shown, or a different configuration of components. The various components shown in FIG. 7 can be implemented in hardware, software, or a combination of both hardware and software, including one or more signal processing and/or application specific integrated circuits.

Wireless circuitry 708 is used to send and receive information over a wireless link or network to one or more other devices' conventional circuitry such as an antenna system, a radio frequency (RF) transceiver, one or more amplifiers, a tuner, one or more oscillators, a digital signal processor, a coder-decoder (CODEC) chipset, memory, etc. Wireless circuitry 708 can use various protocols, e.g., as described herein. In various embodiments, wireless circuitry 708 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, Wi-Fi (such as Institute of Electrical and Electronics Engineers (IEEE) 602.11a, IEEE 602.11b, IEEE 602.11g and/or IEEE 602.11n), Bluetooth, Wi-MAX, Voice Over Internet Protocol (VoIP), near field communication protocol (NFC), a protocol for email, instant messaging, and/or a short message service (SMS), or any other suitable communication protocol, including communication protocols not yet developed as of the filing date of this document.

Wireless circuitry 708 is coupled to processing system 704 via peripherals interface 716. Peripherals interface 716 can include conventional components for establishing and maintaining communication between peripherals and processing system 704. Voice and data information received by wireless circuitry 708 (e.g., in speech recognition or voice command applications) is sent to one or more processors 718 via peripherals interface 716. One or more processors 718 are configurable to process various data formats for one or more application programs 734 stored on medium 702.

Peripherals interface 716 couple the input and output peripherals of device 700 to the one or more processors 718 and computer-readable medium 702. One or more processors 718 communicate with computer-readable medium 702 via a controller 720. Computer-readable medium 702 can be any device or medium that can store code and/or data for use by one or more processors 718. Computer-readable medium 702 can include a memory hierarchy, including cache, main memory and secondary memory. The memory hierarchy can be implemented using any combination of random access memory (RAM) (e.g., static random access memory (SRAM,) dynamic random access memory (DRAM), double data random access memory (DDRAM)), read only memory (ROM), FLASH, magnetic and/or optical storage devices, such as disk drives, magnetic tape, CDs (compact disks) and DVDs (digital video discs). In some embodiments, peripherals interface 716, one or more processors 718, and controller 720 can be implemented on a single chip, such as processing system 704. In some other embodiments, they can be implemented on separate chips.

Processor(s) 718 can include hardware and/or software elements that perform one or more processing functions, such as mathematical operations, logical operations, data manipulation operations, data transfer operations, controlling the reception of user input, controlling output of information to users, or the like. Processor(s) 718 can be embodied as one or more hardware processors, microprocessors, microcontrollers, field programmable gate arrays (FPGAs), application-specified integrated circuits (ASICs), or the like.

Device 700 also includes a power system 742 for powering the various hardware components. Power system 742 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 700 includes a camera 744. In some embodiments, device 700 includes sensors 746. Sensors can include accelerometers, compass, gyrometer, pressure sensors, audio sensors, light sensors, barometers, and the like. Sensors 746 can be used to sense location aspects, such as auditory or light signatures of a location.

In some embodiments, device 700 can include a GPS receiver, sometimes referred to as a GPS unit 748. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 718 run various software components stored in medium 702 to perform various functions for device 700. In some embodiments, the software components include an operating system 722, a communication module 724 (or set of instructions), a location module 726 (or set of instructions), a ranging module 728 that is used as part of ranging operation described herein, and other application programs 734 (or set of instructions).

Operating system 722 can be any suitable operating system, including iOS, Mac OS, Darwin, Real Time Operating System (RTXC), LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 724 facilitates communication with other devices over one or more external ports 736 or via wireless circuitry 708 and includes various software components for handling data received from wireless circuitry 708 and/or external port 736. External port 736 (e.g., universal serial bus (USB), FireWire, Lightning connector, 60-pin connector, etc.) is adapted for coupling directly to other devices or indirectly over a network (e.g., the Internet, wireless local area network (LAN), etc.).

Location/motion module 726 can assist in determining the current position (e.g., coordinates or other geographic location identifiers) and motion of device 700. Modern positioning systems include satellite-based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 726 receives data from GPS unit 748 and analyzes the signals to determine the current position of the mobile device. In some embodiments, location/motion module 726 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 708 and is passed to location/motion module 726. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 700 based on the position coordinates of the corresponding transmitters. Regardless of the specific location technology used, location/motion module 726 receives information from which a location fix can be derived, interprets that information, and returns location information, such as geographic coordinates, latitude/longitude, or other location fix data Ranging module 728 can send/receive ranging messages to/from an antenna, e.g., connected to wireless circuitry 708.

The messages can be used for various purposes, e.g., to identify a sending antenna of a device, determine timestamps of messages to determine a distance of mobile device 700 from another device. Ranging module 728 can exist on various processors of the device, e.g., an always-on processor (AOP), a UWB chip, and/or an application processor. For example, parts of ranging module 728 can determine a distance on an AOP, and another part of the ranging module can interact with a sharing module, e.g., to display a position of the other device on a screen in order for a user to select the other device to share a data item. Ranging module 728 can also interact with a reminder module that can provide an alert based on a distance from another mobile device.

The one or more applications 734 on device 700 can include any applications installed on the device 700, including without limitation, a browser, address book, contact list, email, instant messaging, social networking, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

I/O subsystem 706 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 706 can include a display and user input devices such as a keyboard, mouse, and/or trackpad. In some embodiments, I/O subsystem 706 can include a touch-sensitive display. A touch-sensitive display can also accept input from the user based at least part on haptic and/or tactile contact. In some embodiments, a touch-sensitive display forms a touch-sensitive surface that accepts user input. The touch-sensitive display/surface (along with any associated modules and/or sets of instructions in computer-readable medium 702) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, I/O subsystem 706 can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 700 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display, or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium, such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g., a solid-state drive, a hard drive, a CD, or an entire computer system), and may be present on or within different computer products within a system or network. A computer system may include a monitor, printer, or other suitable display for providing any of the results mentioned herein to a user.

As described above, one aspect of the present technology is the gathering, sharing, and use of data, including an authentication tag and data from which the tag is derived. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to determine a dwell spot using distance measurements that track a user through their daily routine. Further, other uses for personal information data that benefit the user are also contemplated by the present disclosure.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of sharing content and performing ranging, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Although the present disclosure has been described with respect to specific embodiments, it will be appreciated that the disclosure is intended to cover all modifications and equivalents within the scope of the following claims.

All patents, patent applications, publications, and descriptions mentioned herein are incorporated by reference in their entirety for all purposes. None is admitted to be prior art.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method for determining a location of a mobile device within a building, the method comprising performing, by the mobile device:
   performing ranging between the mobile device and a ranging device to obtain ranging measurements over a period of time, the ranging measurements providing distances to the ranging device;
   performing inertial measurements using one or more sensors over the period of time, wherein the inertial measurements include directional measurements of movement of the mobile device;
   identifying a plurality of dwell points at which the mobile device is stationary for at least a threshold amount of time, the identifying using the ranging measurements, the inertial measurements, or both, wherein each of the plurality of dwell points corresponds to a distance from the ranging device;
   determining a first distance from the ranging device by performing a first ranging measurement with the ranging device, the first distance corresponding to a first dwell point of the plurality of dwell points;
   determining a first vector of movement of the mobile device by performing a first inertial measurement, the movement of the mobile device being between the first dwell point and a destination dwell point;
   determining a destination distance from the ranging device by performing a second ranging measurement with the ranging device while the mobile device is at the destination dwell point;
   matching the destination distance to a second distance of a second dwell point of the plurality of dwell points; and
   determining whether the mobile device is at the second dwell point of the plurality of dwell points using the first vector of movement.

2. The method of claim 1, wherein the first vector of movement is a product of a rate vector and a travel time.

3. The method of claim 1, wherein a location of the first dwell point is known.

4. The method of claim 1, wherein the first inertial movement is an average of a plurality of inertial measurements made when the mobile device is moving between dwell points.

5. The method of claim 1, wherein matching the destination distance to the second distance comprises determining that the destination distance and the second distance are within a threshold distance.

6. The method of claim 1, wherein the destination distance is matched to one or more distances of one or more other dwell points of the plurality of dwell points.

7. The method of claim 1, wherein using the first vector of movement comprises:
   determining an intersection between the first vector of movement and a destination dwell circle comprising a circle around the ranging device with a radius equal to the destination distance.

8. The method of claim 1, further comprising:
   responsive to a determination that the mobile device is not at the second dwell point, determining whether the mobile device is at a third dwell point of one or more other dwell points using the first vector of movement.

9. A computing device, comprising:
   one or more memories storing instructions; and
   one or more processors in communication with the one or more memories and configured to execute the instructions stored in the one or more memories to perform operations comprising:
      performing ranging between a mobile device and a ranging device to obtain ranging measurements over a period of time, the ranging measurements providing distances to the ranging device;
      performing inertial measurements using one or more sensors over the period of time, wherein the inertial measurements include directional measurements of movement of the mobile device;
      identifying a plurality of dwell points at which the mobile device is stationary for at least a threshold amount of time, the identifying using the ranging measurements, the inertial measurements, or both, wherein each of the plurality of dwell points corresponds to a distance from the ranging device;
determining a first distance from the ranging device by performing a first ranging measurement with the ranging device, the first distance corresponding to a first dwell point of the plurality of dwell points;
determining a first vector of movement of the mobile device by performing a first inertial measurement, the movement of the mobile device being between the first dwell point and a destination dwell point;
determining a destination distance from the ranging device by performing a second ranging measurement with the ranging device while the mobile device is at the destination dwell point;
matching the destination distance to a second distance of a second dwell point of the plurality of dwell points; and
determining whether the mobile device is at the second dwell point of the plurality of dwell points using the first vector of movement.

10. The device of claim 9, wherein the first vector of movement is a product of a rate vector and a travel time.

11. The device of claim 9, wherein a location of the first dwell point is known.

12. The device of claim 9, wherein the first inertial movement is an average of a plurality of inertial measurements made when the mobile device is moving between dwell points.

13. The device of claim 9, wherein matching the destination distance to the second distance comprises determining that the destination distance and the second distance are within a threshold distance.

14. The device of claim 9, wherein the operations further comprise:
responsive to a determination that the mobile device is not at the second dwell point, determining whether the mobile device is at a third dwell point of one or more other dwell points using the first vector of movement.

15. The device of claim 9, wherein using the first vector of movement comprises:
determining an intersection between the first vector of movement and a destination dwell circle comprising a circle around the ranging device with a radius equal to the destination distance.

16. A non-transitory computer-readable medium storing a plurality of instructions that, when executed by one or more processors of a computing device, cause the one or more processors to perform operations comprising:
performing ranging between a mobile device and a ranging device to obtain ranging measurements over a period of time, the ranging measurements providing distances to the ranging device;
performing inertial measurements using one or more sensors over the period of time, wherein the inertial measurements include directional measurements of movement of the mobile device;
identifying a plurality of dwell points at which the mobile device is stationary for at least a threshold amount of time, the identifying using the ranging measurements, the inertial measurements, or both, wherein each of the plurality of dwell points corresponds to a distance from the ranging device;
determining a first distance from the ranging device by performing a first ranging measurement with the ranging device, the first distance corresponding to a first dwell point of the plurality of dwell points;
determining a first vector of movement of the mobile device by performing a first inertial measurement, the movement of the mobile device being between the first dwell point and a destination dwell point;
determining a destination distance from the ranging device by performing a second ranging measurement with the ranging device while the mobile device is at the destination dwell point;
matching the destination distance to a second distance of a second dwell point of the plurality of dwell points; and
determining whether the mobile device is at the second dwell point of the plurality of dwell points using the first vector of movement.

17. The non-transitory computer-readable medium of claim 16, wherein the first vector of movement is a product of a rate vector and a travel time.

18. The non-transitory computer-readable medium of claim 16, wherein a location of the first dwell point is known.

19. The non-transitory computer-readable medium of claim 16, wherein the first inertial movement is an average of a plurality of inertial measurements made when the mobile device is moving between dwell points.

20. The non-transitory computer-readable medium of claim 16, wherein matching the destination distance to the second distance comprises determining that the destination distance and the second distance are within a threshold distance.

* * * * *